UNITED STATES PATENT OFFICE.

AUGUST LEOPOLD LASKA, OF OFFENBACH-ON-THE-MAIN, GERMANY, ASSIGNOR TO THE FIRM OF K. OEHLER, ANILIN- & ANILINFARBEN-FABRIK, OF OFFENBACH-ON-THE-MAIN, GERMANY.

RED TO VIOLET DYESTUFF AND METHOD OF MAKING SAME.

SPECIFICATION forming part of Letters Patent No. 724,894, dated April 7, 1903.

Application filed November 11, 1902. Serial No. 130,871. (Specimens.)

*To all whom it may concern:*

Be it known that I, AUGUST LEOPOLD LASKA, doctor of philosophy, chemist, residing at 5 Gerberstrasse, Offenbach-on-the-Main, in the Grand Duchy of Hesse, Germany, have invented new and useful Improvements in Red to Violet Dyestuffs, of which the following is a specification.

My invention relates to the production of disazo dyes obtained by the combination of the intermediate products from paradiamins and the oxycarboxylic acids of the benzene series with glycins of the amidonaphthol sulfonic acids, the constitution of which is represented by the following formula:

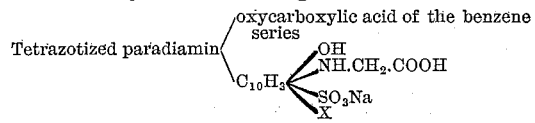

"X" meaning a hydrogen atom or a sulfo group. As paradiamins may be used, benzidin, tolidin, dianisidin, paraphenylenediamin, as oxycarboxylic acids—those of the benzene series and their homologues, as glycins, those of the amidonaphthol sulfonic acids susceptible of combining with diazo compounds. The resulting coloring-matters dye on unmordanted cotton red to violet shades of great fastness to light and acids. They may further be employed for dyeing wool and for preparing fast dyelacs.

The following example illustrates the nature of my invention and in what manner the same may be carried out into practical effect: 9.2 parts of benzidin are dissolved in 28.6 parts of hydrochloric acid of 20° Baumé and two hundred parts of water, then cooled with ice, tetrazotized by means of 6.9 parts sodium nitrite, then poured into an ice-cold soda-alkaline solution of 7.3 parts of salicylic acid. The intermediate product having been formed, a solution of 17.2 parts of the glycin of the 2.5-amidonaphthol-7-sulfonic acid is added. In order to complete the formation of the dyestuff, the mixture is stirred for twenty-four hours, heated up to 80° centigrade, then precipitated with common salt, filtered, pressed, and dried. The dyestuff thus resulting forms a reddish-brown powder, easily soluble in cold water with a red color and dyeing on unmordanted cotton a fast red.

Now what I claim, and desire to secure by Letters Patent, is the following:

1. The manufacture and production of substantive red to violet disazo dyestuffs, consisting in the combination of the intermediate products from paradiamins and the oxycarboxylic acids of the benzene series with the glycins of the amidonaphtholsulfonic acids of the general formula:

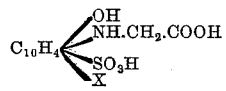

"X" meaning a hydrogen atom or a sulfo group.

2. As new articles of manufacture the red to bluish-red dyestuffs, which result from the combination of the intermediate products from paradiamins and the oxycarboxylic acids of the benzene series with the glycin of the 2.5-amidonaphthol-7-sulfonic acid of the formula $$SO_3H-\phantom{xxx}-NH.CH_2.COOH$$
$$OH$$

which are easily soluble in water with a red color and dyeing unmordanted cotton in red to bluish-red shades.

3. As a new article of manufacture the dyestuff of the following constitution:

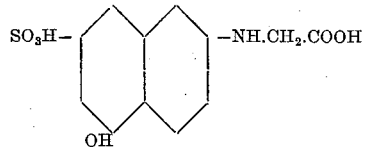

forming a brown powder, dissolving in water to a red solution, which turns brownish on adding concentrated soda-lye and separates brown flocks on addition of hydrochloric acid, dissolving in concentrated sulfuric acid with a reddish-blue color and dyeing on unmordanted cotton fast-red shades.

In testimony whereof I have signed my name to this specification in the presence of two subscribing witnesses.

AUGUST LEOPOLD LASKA.

Witnesses:
OSKAR STUMHARDT,
EVA SATTLER.